(12) United States Patent
Imai (10) Patent No.: US 6,389,267 B1
(45) Date of Patent: May 14, 2002

(54) FOLDED TYPE PORTABLE RADIO COMMUNICATION APPARATUS WITH FUNCTIONALITY

(75) Inventor: Fumihito Imai, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/122,640

(22) Filed: Jul. 27, 1998

(30) Foreign Application Priority Data

Aug. 12, 1997 (JP) ............................................. 9-217312

(51) Int. Cl.[7] ................................................. H04B 1/38
(52) U.S. Cl. .......................................... 455/90; 455/575
(58) Field of Search ........................... 455/90, 575, 550, 455/566, 569; 379/433, 428, 426, 429, 431, 420, FOR 103; D14/142, 148

(56) References Cited

U.S. PATENT DOCUMENTS

| | | | | |
|---|---|---|---|---|
| 5,276,916 A | * | 1/1994 | Pawlish et al. | 455/575 |
| 5,335,261 A | * | 8/1994 | Fujinaka | 455/90 |
| 5,610,971 A | * | 3/1997 | Vandivier | 455/569 |
| 5,657,370 A | * | 8/1997 | Tsugane et al. | 455/550 |
| 5,668,867 A | * | 9/1997 | Nagai | 379/433.13 |
| 5,751,804 A | * | 5/1998 | Mendolia | 379/433 |
| 5,864,766 A | * | 1/1999 | Chiang | 455/572 |
| 5,884,156 A | * | 3/1999 | Gordon | 455/350 |
| 5,933,783 A | * | 8/1999 | Kawakami et al. | 455/550 |
| 6,014,573 A | * | 1/2000 | Lehtonen et al. | 455/569 |
| 6,047,196 A | * | 4/2000 | Makela et al. | 455/556 |

FOREIGN PATENT DOCUMENTS

| | | |
|---|---|---|
| DE | 296 10 265 | 10/1996 |
| DE | 195 20 947 | 12/1996 |
| EP | 0 472 361 | 2/1992 |
| EP | 0 651 546 | 5/1995 |
| EP | 0 776 115 | 5/1997 |
| JP | 4-66841 | 6/1992 |
| JP | 4-286444 | 10/1992 |
| JP | 5-30166 | 2/1993 |
| JP | 5-292165 | 11/1993 |
| JP | 5-327842 | 12/1993 |
| JP | 637697 | 2/1994 |
| JP | 94703103 | 9/1994 |
| JP | 8-139630 | 6/1996 |
| JP | 8-237158 | 9/1996 |
| JP | 8-265403 | 10/1996 |
| JP | 9-18555 | 1/1997 |

* cited by examiner

*Primary Examiner*—Dwayne Bost
*Assistant Examiner*—Joy Contee
(74) *Attorney, Agent, or Firm*—Young & Thompson

(57) ABSTRACT

A folded type portable radio communication apparatus has a first housing having a first speech receiving section on an inner surface thereof and a second housing having a first speech transmitting section on an inner surface thereof. A hinge section rotatably connects the first housing and the second housing such that the first housing and the second housing are folded to oppose the inner surface of the first housing to the inner surface of the second housing. A second speech receiving section and a second speech transmitting section are provided on an outer surface of one of the first and second housings to allow communication in a folded state.

5 Claims, 8 Drawing Sheets

FOLDED TYPE PORTABLE RADIO COMMUNICATION APPARATUS WITH FUNCTIONALITY

BACKGROUND OF THE INVENTION

1. Field of the Invention

The present invention relates to a folded type portable radio communication apparatus, and more particularly to a folded type portable radio communication apparatus in which it is possible to communicate in the folded state.

2. Description of the Related Art

A portable telephone apparatus is conventionally provided with a radio unit, a speech receiving section, a speech transmitting section, a key operation section composed of key buttons, and a display section for displaying data such as telephone numbers. In such a portable telephone apparatus of this type, because the positions of the speech receiving section and speech transmitting section are required to respectively correspond the positions of an ear and mouth of a user, the apparatus becomes large in size so that portability is very low.

Figure 1:
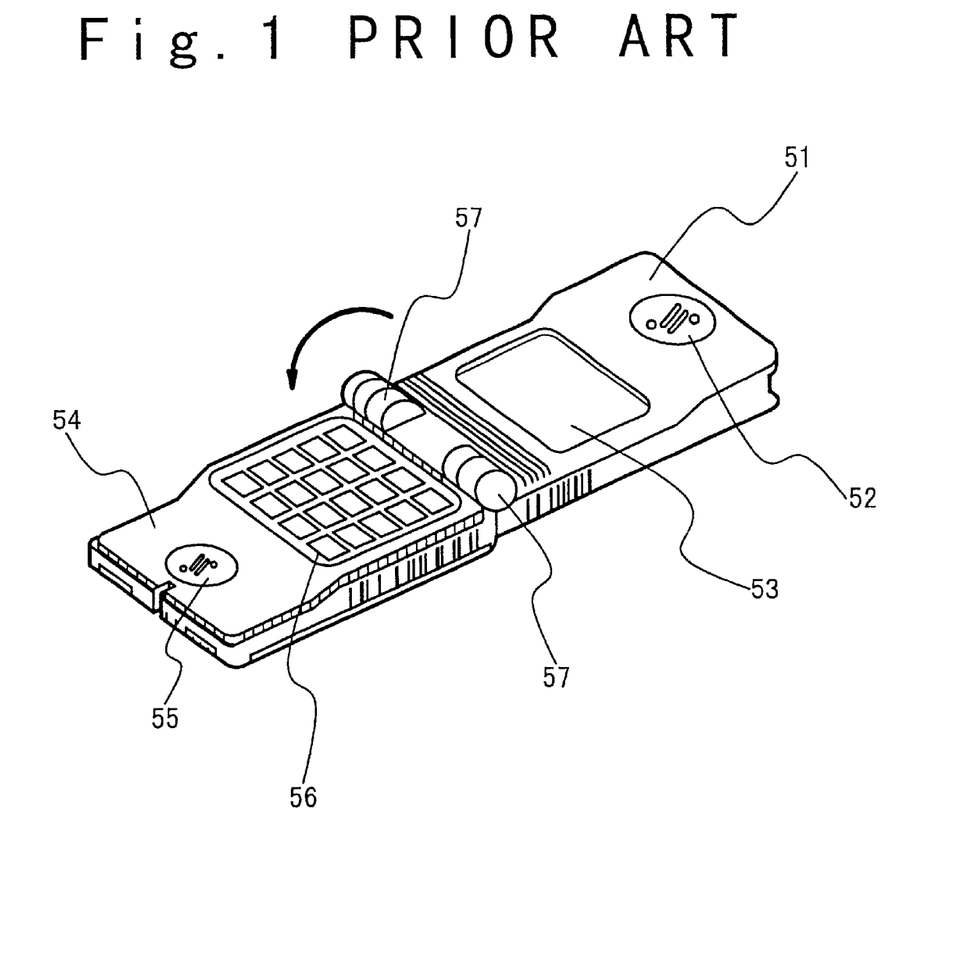
FIG. 1 is a perspective view of an outward appearance of a conventional folded type portable radio communication apparatus.

For this reason, a conventional example of a folded type portable telephone apparatus as shown in FIG. 1 is provided. Referring to FIG. 1, the conventional folded type portable telephone apparatus is composed of an upper housing 51, a lower housing 54 and a hinge section 57 which rotatably supports the upper housing 51 and the lower housing 54 to allow the development and the closing. A speech receiving section 52, a display section 53 and so on are provided on the upper housing 51, and a speech transmitting section 55, a key operation section 56 and so on are provided on the lower housing 54.

In such a folded type portable telephone apparatus, the upper and lower housings are folded in the carrying state to make the telephone small in size. In the using state, the upper and lower housing are developed into a direction shown by an arrow.

However, in such a folded type portable telephone apparatus, there is a problem in that the speech communication cannot be performed in the state in which the housings are not developed.

A portable telephone apparatus is described in Japanese Laid Open Patent Application (JP-A-Heisei 4-286444). In this reference, an additional function unit is installed in place of a battery cell case to allow exchange of signals between the telephone apparatus and the additional function unit so that the telephone apparatus can be operated based on the functions of the additional function unit.

In Japanese Laid Open Patent Application (JP-A-Heisei 5-292165), a portable radio communication apparatus is described. In this reference, a battery cell package is provided with an optional circuit and a connector for the circuit. The battery cell package is installed into the main body of the apparatus via the connector. At this time, power is supplied to the main body of the apparatus so that a basic function and an option function are realized. Thus, by changing the battery cell package, various functions are realized.

In Japanese Laid Open Patent Application (JP-A-Heisei 5-30166), a portable radio telephone apparatus is described. In this reference, a microphone flip section has a transparent panel window in a position corresponding to a display section of the main body of the apparatus. Thus, the viewing of the display section is enabled in the state in which the microphone flip section is closed.

In Japanese Laid Open Patent Application (JP-A-Heisei 8-265403) corresponding to a U.S. patent application Ser. No. 08/401,392, a portable telephone apparatus is described. In this reference, the portable telephone apparatus is composed of the main body of the apparatus having a concave portion on the side surface, a flip stand, an acoustic baffle, and a speaker. The flip stand is provided for the main body of the apparatus and is movable between a first position inside of the concave portion and a second position outside of the concave portion. When being positioned in the second position, the flip stand functions to support the main body toward an upper direction of the surface. The acoustic baffle is formed between the flip stand of the main body of the apparatus and the surface of the main body when it is positioned in the second position. The acoustic baffle has an inverse V-shape such that one end is opened. The speaker transfers acoustic energy into the acoustic baffle.

In Japanese Laid Open Patent Application (JP-A-Heisei 9-18555), a radio communication apparatus is described. In this reference, a vibrator or a battery cell package built in the vibrator is provided to be detachable from the radio communication apparatus. Thus, the information of call arrival is mechanically switched between vibration and sound.

However, even in any of the above references, the problem in that the speech communication cannot be performed in the state in which the housings are not opened developed is not solved.

SUMMARY OF THE INVENTION

The present invention is accomplished in view of the above problems. Therefore, an object of the present invention is to provide an improved folded type portable radio communication apparatus which can solve the above-mentioned problems.

Another object of the present invention is to provide a folded type portable radio communication apparatus in which communication can be performed in the closing state.

Still another object of the present invention is to provide a folded type portable radio communication apparatus in which a plurality of speech receiving sections or speech transmitting sections can be automatically switched.

In order to achieve an aspect of the present invention, a folded type portable radio communication apparatus includes a first housing having a first speech receiving section on an inner surface thereof, a second housing having a first speech transmitting section on an inner surface thereof, a hinge section rotatably connecting the first housing and the second housing such that the first housing and the second housing are folded to oppose the inner surface of the first housing to the inner surface of the second housing, and a second speech receiving section and a second speech transmitting section provided on an outer surface of one of the first and second housings to allow communication in a folded state.

One of the first and second housings may further include a detachable battery cell package on whose outer surface the second speech transmitting section and the second speech receiving section are provided. Otherwise, the folded type portable radio communication apparatus may further include a display section used to display a data provided on the outer surface of one of the first and second housings.

Also, the folded type portable radio communication apparatus may further include a first key operation section provided on the inner surface of one of the first and second housings, and a second key operation section provided on the outer surface of one of the first and second housings. In this case, the second key operation section desirably includes at least one of an end key used to end a communication state, an originating key used to originate a call, and a response key used to respond to an arrived call.

When a first transmitting and receiving unit includes the first speech transmitting section and the first speech receiving section, and a second transmitting and receiving unit includes the second speech transmitting section and the second speech receiving section, an active transmitting and receiving unit may be switched between the first transmitting and receiving unit and the second transmitting and receiving unit in response to an operation of one of the first and second key operation sections.

Alternatively, the active transmitting and receiving unit may be switched between the first transmitting and receiving unit and the second transmitting and the receiving unit in response to an operation of one of the first key operation section and the response key.

Further, the first transmitting and receiving unit and the second transmitting and the receiving unit are reset to an initial state in response to the end key.

When a switch is provided on the inner surface of one of the first and second housings to indicate whether the first and second housings are folded, one of the first transmitting and receiving unit and the second transmitting and the receiving unit may be selected an active transmitting and receiving unit based on a state of the switch.

In order to achieve another aspect of the present invention, a folded type portable radio communication apparatus includes a first housing having a first speech receiving section on an inner surface thereof, and a second housing having a first speech transmitting section on an inner surface thereof, a first transmitting and receiving section including the first speech transmitting section and the first speech receiving section. A hinge section rotatably connects the first housing and the second housing such that the first housing and the second housing are folded to oppose the inner surface of the first housing to the inner surface of the second housing. A second transmitting and receiving section includes a second speech receiving section and a second speech transmitting section provided on an outer surface of one of the first and second housings to allow communication in a folded state. A first key operation section is provided on the inner surface of one of the first and second housings, and a second key operation section is provided on the outer surface of the other of the first and second housings, and including at least one of an end key used to end a communication state, an originating key used to originate a call, and a response key used to respond to an arrived call.

One of the first and second housings may further include a detachable battery cell package on whose outer surface the second speech transmitting section and the second speech receiving section are provided. Also, the folded type portable radio communication apparatus may further include a display section used to display data provided on the outer surface of the other of the first and second housings.

In the folded type portable radio communication apparatus, an active transmitting and receiving unit may be switched between the first transmitting and receiving unit and the second transmitting and the receiving unit in response to an operation of one of the first and second key operation sections instead, the active transmitting and receiving unit may be switched between the first transmitting and receiving unit and the second transmitting and receiving unit in response to an operation of one of the first key operation section and the response key.

Further, the first transmitting and receiving unit and the second transmitting and the receiving unit may be reset to an initial state in response to the end key.

When a switch is provided on the inner surface of one of the first and second housings to indicate whether the first and second housings are folded, one of the first transmitting and receiving unit and the second transmitting and the receiving unit may be selected an active transmitting and receiving unit based on a state of the switch.

DESCRIPTION OF THE PREFERRED EMBODIMENTS

Next, a folded type portable radio communication apparatus of the present invention will be described below in detail with reference to the attached drawings.

Figure 2A:
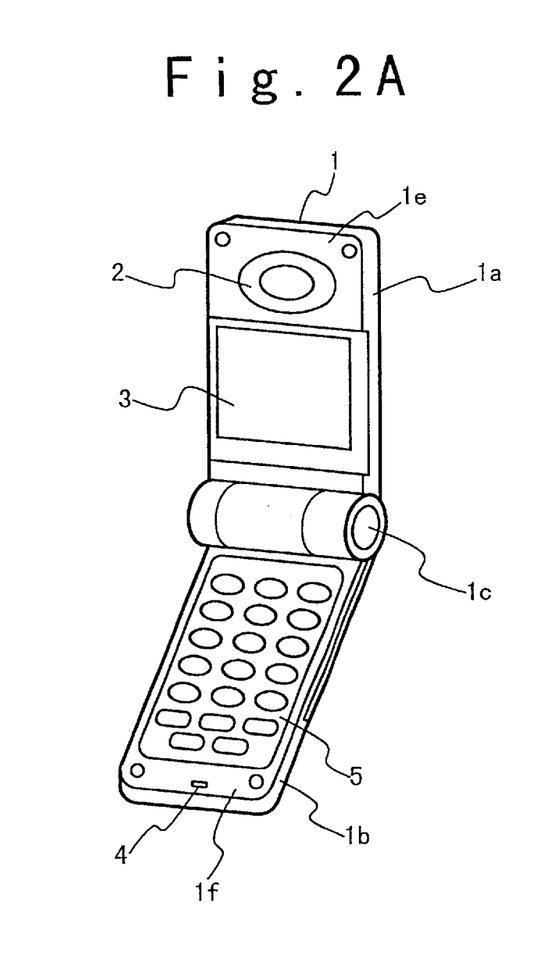
FIGS. 2A and 2B are perspective views of a folded type portable radio communication apparatus according to a first embodiment of the present invention in a developed open state and a closed state, respectively.
Figure 2B:
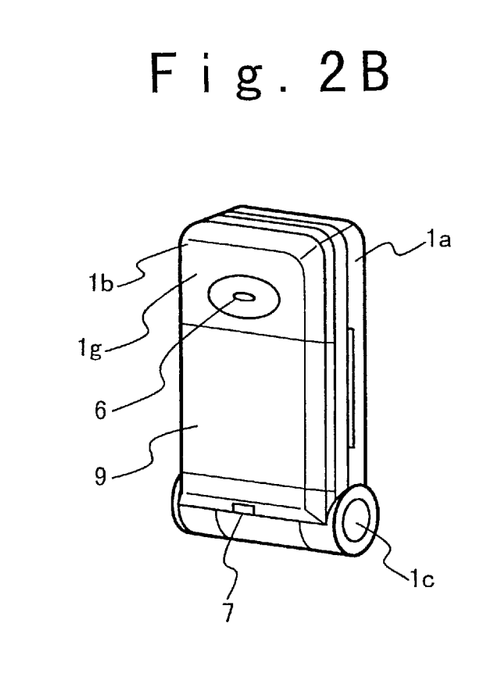
Figure 3A:
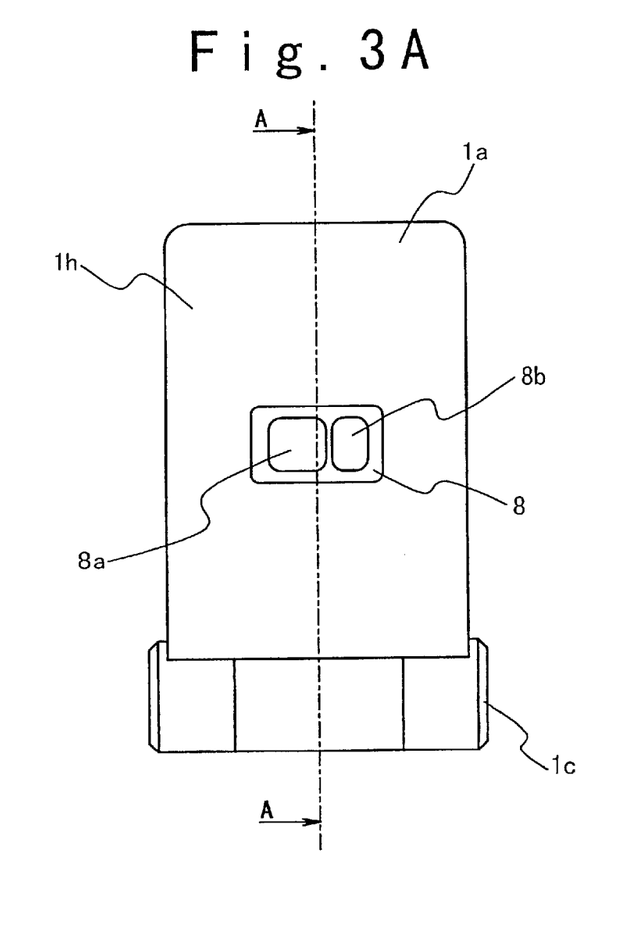
FIG. 3A is a back view of the folded type portable radio communication apparatus according to the first embodiment of the present invention in the closed state.
Figure 3B:
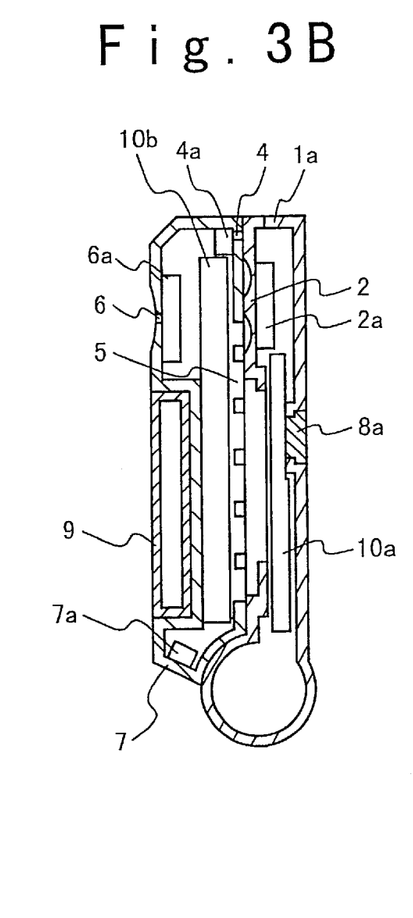
FIG. 3B is a cross sectional view of the folded type portable radio communication apparatus according to the first embodiment of the present invention along the line A—A shown in FIG. 3A.

FIGS. 2A and 2B are perspective views of a folded type portable radio communication apparatus according to a first embodiment of the present invention in a developed state and a closed state, respectively. FIG. 3A is a back view of the folded type portable radio communication apparatus according to the first embodiment of the present invention in the closed state. FIG. 3B is a cross sectional view of the folded type portable radio communication apparatus according to the first embodiment of the present invention along the line A—A shown in FIG. 3A.

Referring to FIGS. 2A and 2B, the housing 1 of the folded type portable telephone apparatus is divided into an upper housing 1a as the first housing and a lower housing 1b as the second housing. The upper housing 1a and the lower housing 1b are rotatably connected by a hinge section 1c. Therefore, the upper housing 1a and the lower housing 1b are possible to rotate around the hinge section 1c. As a result, the developed state shown in FIG. 2A and the closed state shown in FIG. 2B are accomplished.

A first speech receiving section 2 and a display section 3 are provided on the inner surface 1e of the upper housing 1a which is opposite to the lower housing 1b in the closed state.

On the other hand, a first speech transmitting section 4 and a first key operation section 5 used to respond to an arrived call or to end the communication state are provided on the inner surface 1f of the lower housing 1b which is opposite to the upper housing 1a in the closed state.

A second speech receiving section 6 and a second speech transmitting section 7 are provided on the outer surface 1g of the lower housing 1b opposite to the surface 1f. The second speech receiving section 6 and the second speech transmitting section 7 may be provided on the outer surface of the upper housing 1a.

Also, a battery cell package 9 is provided on the side of the surface 1g. The second speech receiving sections 6 and the second speech transmitting section 7 are exposed in the closed state of the housings 1a and 1b.

A second key operation section 8 is provided on the back surface 1h of the upper housing 1a opposite to the surfaces 1e. The second key operation section 8 is desirably provided in a substantially central portion of the surface 1h. The second key operation section 8 contains a key 8a used to respond to an arrived call and a key 8b used to end the communication state.

Referring to FIGS. 3A and 3B, there are installed a first receiver 2a in the first speech receiving section 2 which is provided for the upper housing 1a, a first transmitter 4a in the first speech transmitting section 4 which is provided for the lower housing 1b, a second receiver 6a in the second speech receiving section 6 and a second transmitter 7a in the second speech transmitting section 7. A radio section 10a for speech transmission and reception and a control unit 10b are installed in the upper housing 1a and the lower housing 1b, respectively. The respective sections are electrically connected by wirings (not shown) such that speech transmission and reception can be performed in a well known method to a person in the art.

In this way, in the present invention, the upper housing 1a and the lower housing 1b are opened for operating the first key operation section 5 and speech communication is performed by use of the first speech receiving section 2 and the first speech transmitting section 4. In addition, even in the closed state of the housing 1, by operating the second key operation section 8, the response to an arrived call and the ending of the communication can be performed by use of the second speech receiving section 6 and the second speech transmitting section 7.

In the above-mentioned first embodiment, a first speech transmitting and receiving unit (the first speech transmitting section and the first speech receiving section) and a second speech transmitting and receiving unit (the second speech transmitting section and the second speech receiving section) may be usable at the same time, that is, may be in an active state. However, it is desirable that one of the first speech transmitting and receiving unit and the second speech transmitting and receiving unit is selectively activated in accordance with the using state.

For the purpose of such selective use, it could be considered that the first speech transmitting and receiving unit is set to the active state in a normal state, and the control unit 10b performs switching in response to the operation of the second key operation section 8 such that the second speech transmitting and receiving unit is set to the active state. When the second speech transmitting and receiving unit is used, the first speech transmitting and receiving unit is set to an inactive state, of course.

Figure 4:
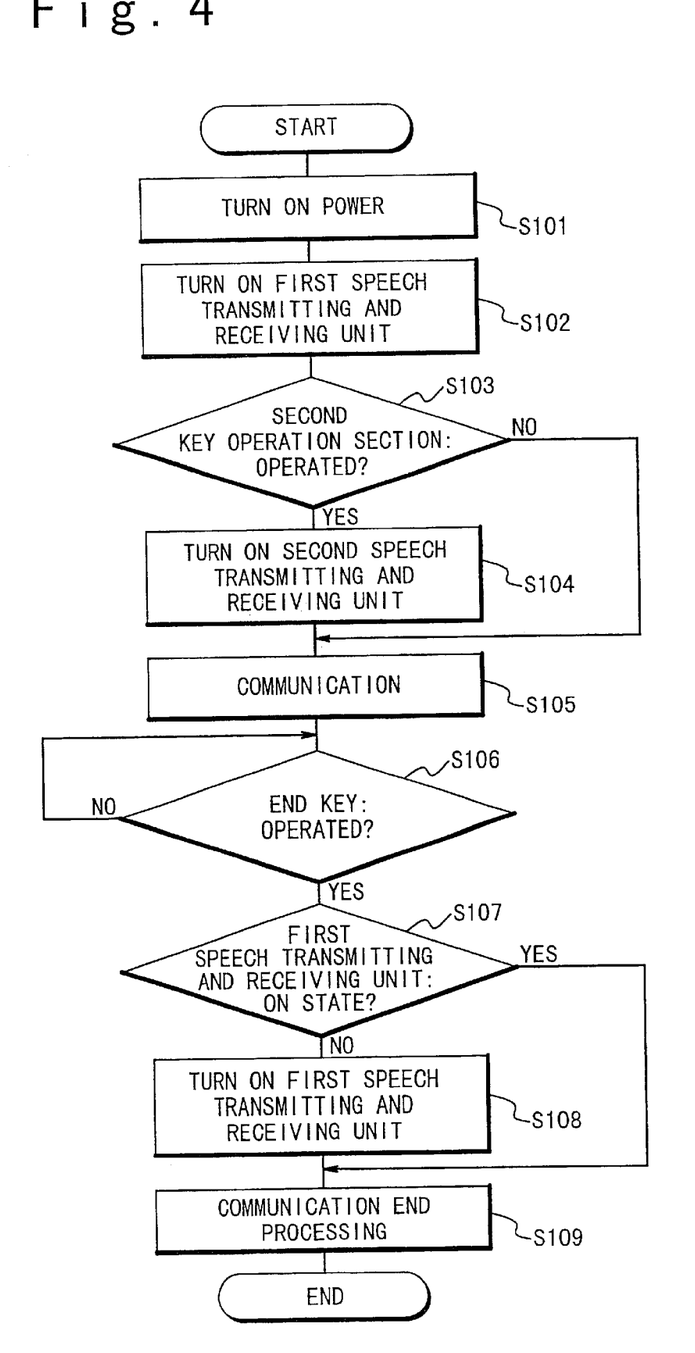
FIG. 4 is a flow chart to describe the operation of the folded type portable radio communication apparatus according to the first embodiment of the present invention.

The control operation of the control unit 10b in this case will be described with reference to the flow chart shown in FIG. 4.

When a power supply (not illustrated) is turned on, e.g., when a power supply switch is turned on so as to supply power to the respective sections (Step S101), the control unit 10b controls the first speech transmitting and receiving unit to be set to the active state (Step S102).

After that, when a call arrives and the second key operation section 8 is operated (Step S103, YES), the first speech transmitting and receiving unit is set to be inactive and the second speech transmitting and receiving unit is set to an active state (Step S104). As a result, speech communication is started (Step S105).

On the other hand, when the first key operation section 5 is operated without operation of the second key operation section 8 in the step S103, the speech communication is started in the state just as it is.

When the operation of the end key 8b is performed during the speech communication (Step S106, YES), if the second speech transmitting and receiving unit is in the active state, i.e., if the first speech transmitting and receiving unit is not in the active state (Step S107, YES), the first speech transmitting and receiving unit is set to the active state and the second speech transmitting and receiving unit is set to inactive (Step S108). Thus, the speech communication ending process is performed (Step S109).

On the other hand, if the first speech transmitting and receiving unit is in the active state (step S107, YES), the speech communication ending process is performed just as it is.

It should be noted that when the end key 8b is operated in the step S106, the second speech transmitting and receiving unit may be set to be inactive and the first speech transmitting and receiving unit may be set to the active state.

Alternatively, after the speech communication ending process, the switching of the first and second speech transmitting and receiving units between the active state and the inactive state may be performed.

Next, the folded type radio communication apparatus according to the second embodiment of the present invention will be described below with reference to a flow chart of FIG. 5. The second embodiment has the same structure as that of the first embodiment.

In the second embodiment, both of the first and second speech transmitting and receiving units are set to the inactive state in the normal state. Then, under the control of the control unit 10b, the first speech transmitting and receiving unit may be set to the active state in response to the operation of the first key operation section 5. Also, the second speech transmitting and receiving unit may be set to the active state in response to the operation of the second key operation section 5.

Figure 5:
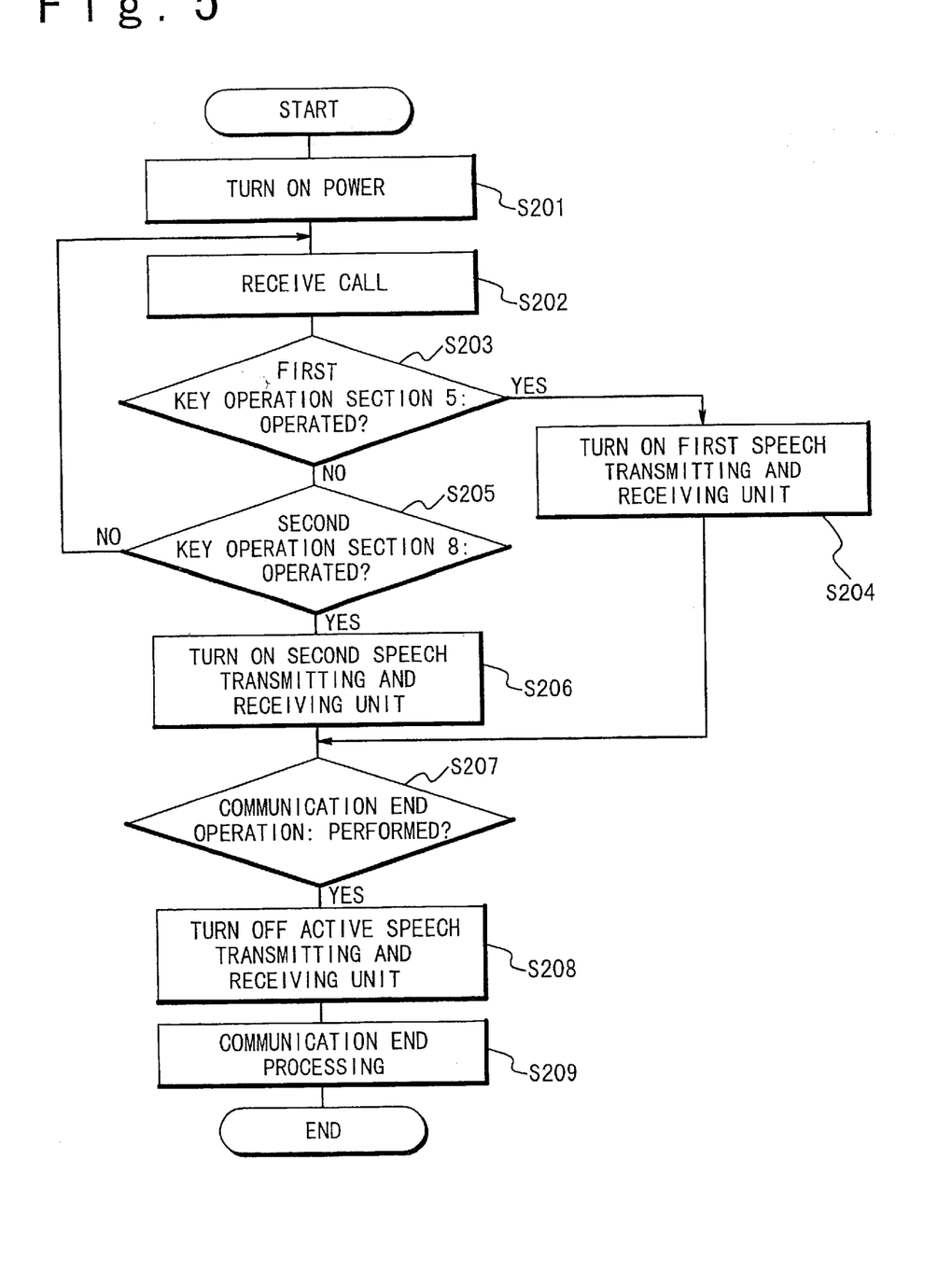
FIG. 5 is a flow chart to describe the operation of the folded type portable radio communication apparatus according to a second embodiment of the present invention.

Referring to FIG. 5, when a power supply is turned on (Step S201), there is an arrived call (Step S202), and the first key operation section 5 is operated (Step S203, YES), the first speech transmitting and receiving unit is set to the active state (Step S204).

On the other hand, when the response key 8*a* of the key operation section 8 is operated without operation of the first key operation section 5 (Step S205, YES), the second speech transmitting and receiving unit is set to the active state (Step S206).

When the speech communication ending process is started during the speech communication (Step S207, YES), the speech transmitting and receiving unit in the active state, i.e., the currently used speech transmitting and receiving unit is set to the inactive state (Step S208). Then, the speech communication ending process is performed (Step S209).

Figure 6A:
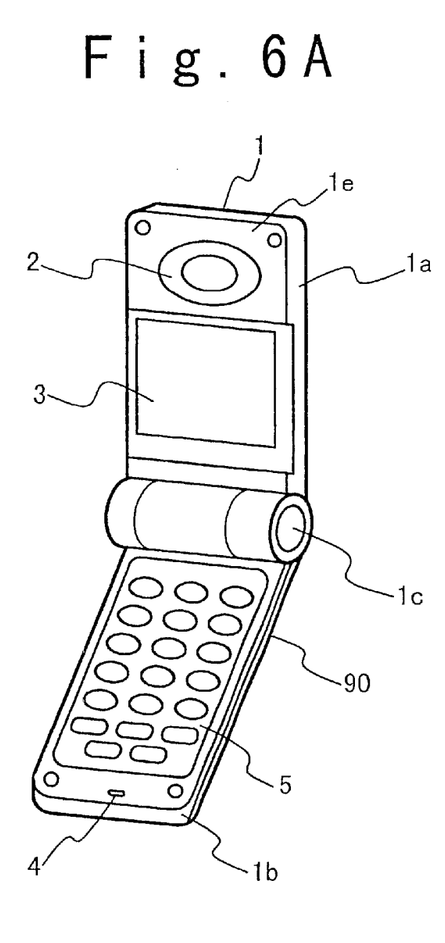
FIGS. 6A and 6B are perspective views of the folded type portable radio communication apparatus according to a third embodiment of the present invention in a developed open state and a closed state, respectively.
Figure 6B:
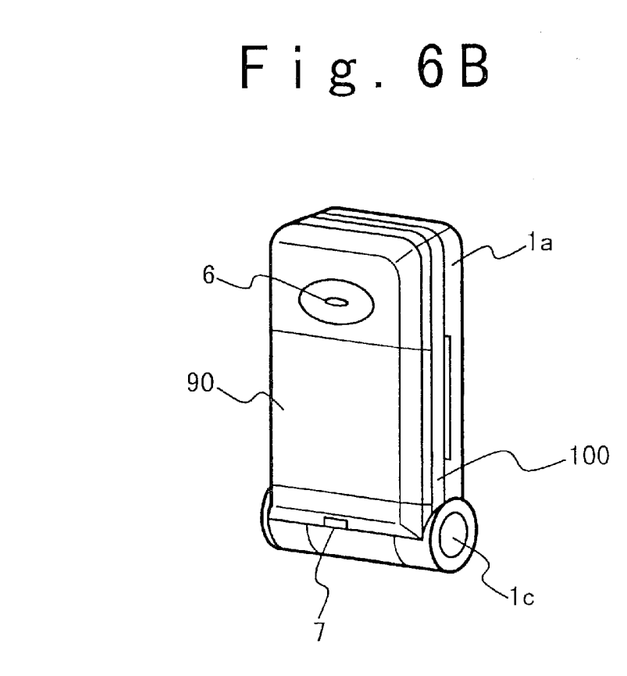

In the above-mentioned second embodiment, the second speech transmitting and receiving unit is provided to the lower housing l*b*. However, in the folded type portable radio communication apparatus according to the third embodiment, the battery cell package 90 is arranged on the whole surface of the lower housing 100 as shown in FIGS. 6A and 6B. At this time, the speech transmitting section 7 and the speech receiving section 6 may be provided on the outer surface of the battery cell package 90.

Figure 7A:
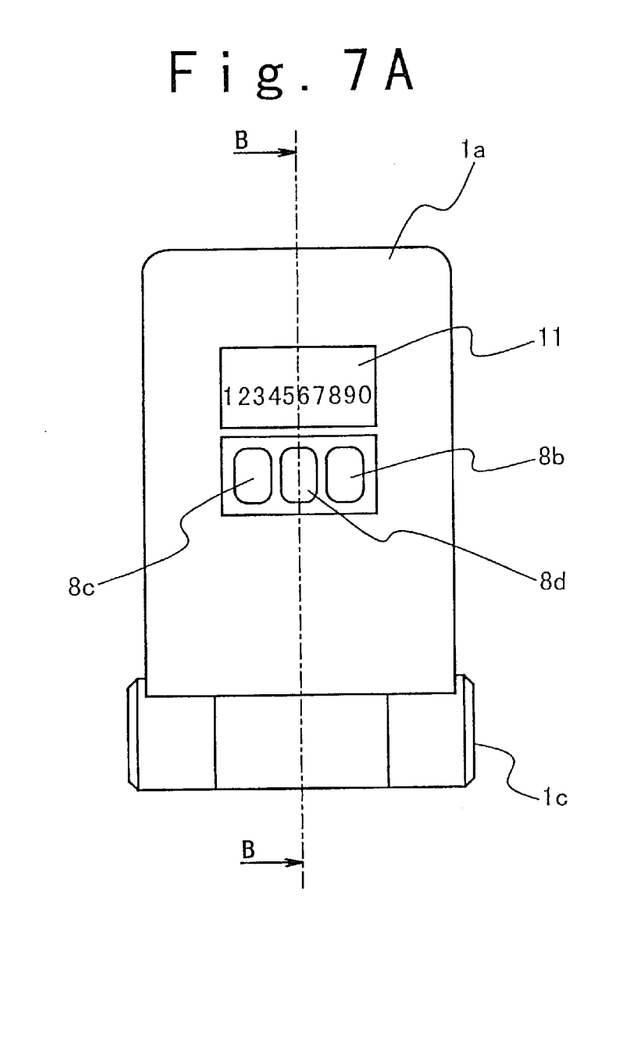
FIG. 7A is a back view of the folded type portable radio communication apparatus according to the third embodiment of the present invention in the closed state.

Also, as shown in FIG. 7A, there may be provided a call arriving and originating key 8*c*, keys 8*d* for inputting information such as a telephone number, and a second display section 11 for displaying the information such as the telephone number on the outer surface of the upper housing 1*a*. The keys 8*d* may be ones by which digits such as the telephone number can be selectively inputted with a well-known method. Also, the key 8*d* may be one by which a telephone number of a telephone number list is selected and read out with a well-known method. Further, the key 8*d* may have a single key or ten keys as then first key operation section 5. In addition, as shown in FIG. 3A, a response key used to respond to an arrived call key may be provided independent of the call originating key.

Figure 7B:
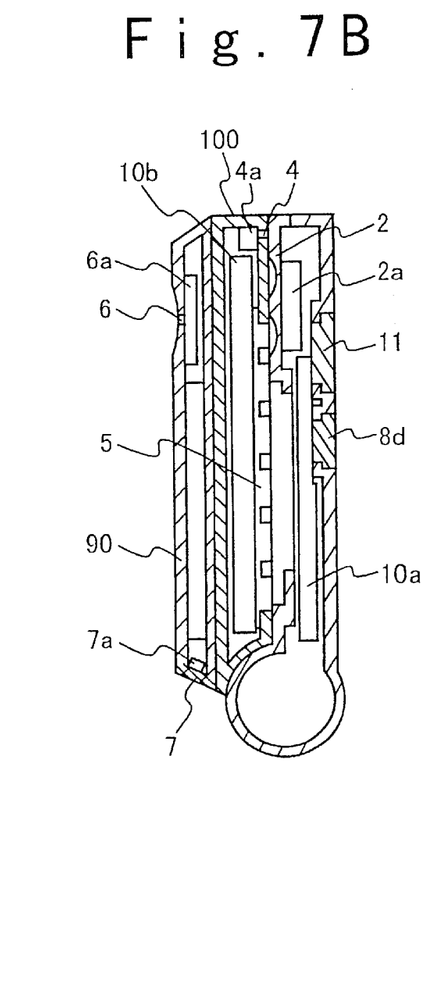
FIG. 7B is a cross sectional View of the folded type portable radio communication apparatus according to the third embodiment of the present invention along the line B—B shown in FIG. 7A.

It should be noted that FIG. 7A is a back view of the upper housing l*a* of FIG. 6B, and FIG. 7B is a cross sectional view of the folded type portable radio communication apparatus along the line B—B in FIG. 7A.

By such a structure, it is possible to perform a call originating operation in the closed state in addition to a call receiving operation.

Figure 8:
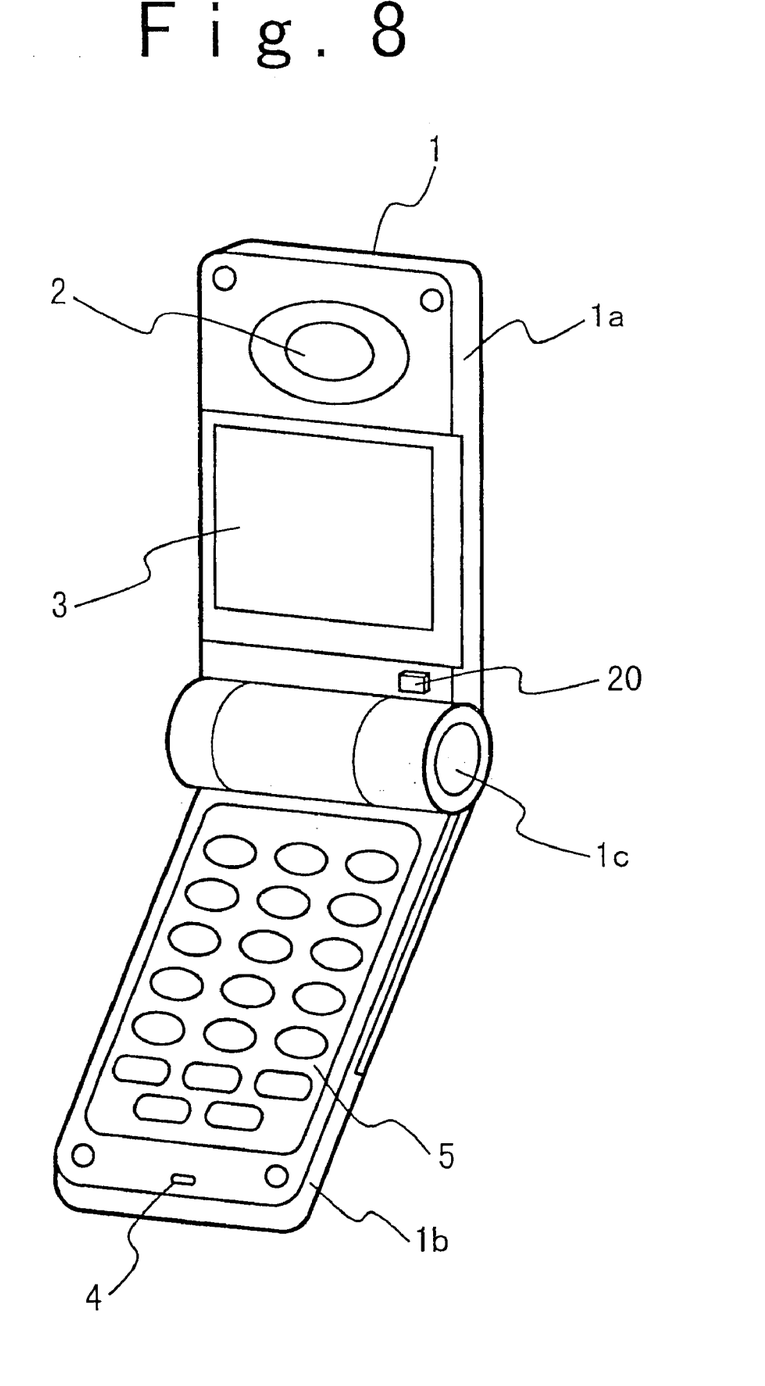
FIG. 8 is a perspective view of an outward appearance of the folded type portable radio communication apparatus according to a fourth embodiment of the present invention.

FIG. 8 is an outward appearance diagram of the folded type portable radio communication apparatus according to the fourth embodiment of the present invention. Referring to FIG. 8, the fourth embodiment is different from the first embodiment shown in FIGS. 2A and 2B in that a switch 20 is provided on the inner surface 1*e* of the upper housing 1*a*. The switch 20 protrudes from the inner surface of the upper housing 1*a*, and is pushed by the inner surface 1*f* of the lower housing 1*b* in the closed state of the housing 1 such that the switch 20 is buried into the upper housing 1*a*.

The control unit 10*b* detects the state of the switch 20, so that the speech transmitting and receiving unit to be used can be automatically switched between the first speech transmitting and receiving unit and the second speech transmitting and receiving unit. That is, when the housing 1 is used in the developed state so that switch 20 protrudes from the surface, the first speech transmitting and receiving unit is selected. On the other hand, when the housing 1 is used in the closed state so that the switch 20 is buried into the housing 1, the second speech transmitting and receiving unit is selected.

The other components are the same as those in the first embodiment. Therefore, the description will be omitted to avoid redundancy.

By adoption of such a structure, the selection can be mechanically performed in the present invention.

In the above-mentioned embodiments, the folded type portable telephone apparatus is described. However, the present invention can be applied to the folded type portable telephone apparatus. In this case, communication can be performed in the folded state of the housing.

Also, in the above-mentioned embodiments, the components are arranged on the upper housing and the lower housing. However, the arrangement of the components is not limited to this. The components may are be arranged regardless of the upper housing and the lower housing to satisfy the spirit of the present invention.

Further, it is desirable that the number of keys which are provided on the outer surface of the apparatus be small.

It should be noted that although the distance between the speech transmitting section and the speech receiving section is small in the closed state, the influence to the speech communication can be almost ignored.

As described above, in the present invention, the first speech receiving section, the first speech transmitting section and the first key operation section are provided on the inner surface of the apparatus and the second speech receiving section, the second speech transmitting section and the second key operation section which is used to respond to the arrived call and to perform the speech communication ending process are provided on the outer surface of the apparatus. Therefore, the folded type portable communication apparatus can be used in the closed or unfolded state.

Also, because the call originating key is provided in the second key operation section, the call originating operation can be also performed in the closed state.

Moreover, because the folded type portable radio communication apparatus has the display section on the outer surface of the apparatus, the further improvement of operability can be realized in case of use in the closed state.

What is claimed is:

1. A portable radio communication apparatus comprising:
   a first housing having a first speaker and a display on an inner surface thereof;
   a second housing having a first microphone and a first keypad on an inner surface thereof;
   a hinge rotatably connecting said first housing and said second housing so that said inner surfaces of said first and second housings oppose each other when said first and second housings are folded together and so that said display and said first keypad are exposed and available for use when said first and second housings are unfolded,
   said first speaker and said first microphone being arranged and adapted for operation only when said first and second housings are unfolded,
   said first speaker and said first microphone being spaced apart when said first and second housings are unfolded so that said first speaker fits next to a user's ear and said first microphone fits next to a user's mouth during operation of said first speaker and said first microphone; and
   a second speaker and a second microphone on an outer surface of one of said first and second housings and a second keypad on an outer surface of the other one of said first and second housings for operating said second speaker and said second microphone.

2. The portable radio communication apparatus of claim 1, wherein said second keypad includes an off-hook select switch and does not include alphanumeric keys.

3. The portable radio communication apparatus of claim 1, further comprising a battery cell package on said outer surface of said one of said first and second housings.

4. The portable radio communication apparatus of claim 3, wherein said second speaker and said second microphone are on an outer surface of said battery cell package.

5. The portable radio communication apparatus of claim 1, wherein said outer surface of said other one of said first and second housings further comprises a display and wherein said second keypad includes an off-hook select switch and plural keys.

* * * * *